(12) United States Patent
Lin et al.

(10) Patent No.: US 6,694,892 B2
(45) Date of Patent: Feb. 24, 2004

(54) EXHAUSTING DEVICE FOR ANATOMIC OPERATION

(75) Inventors: Chin-Liang Lin, Taipei (TW); Cheng-Ping Chang, Shi Jr (TW); Rong-Ing Cheng, Shi Jr (TW)

(73) Assignee: Institute of Occupation Safety and Health, Taipei (TW)

( * ) Notice: Subject to any disclaimer, the term of this patent is extended or adjusted under 35 U.S.C. 154(b) by 93 days.

(21) Appl. No.: 09/998,781

(22) Filed: Dec. 3, 2001

(65) Prior Publication Data

US 2003/0101915 A1 Jun. 5, 2003

(51) Int. Cl.[7] ............................................. A47B 37/00
(52) U.S. Cl. ...................................... 108/50.13; 269/15
(58) Field of Search ........................ 108/50.11, 50.13, 108/50.18; 27/24.1, 24.2, 23.1, 21.1; 269/15, 13, 139; 128/917; 5/600, 606

(56) References Cited

U.S. PATENT DOCUMENTS

| | | | | |
|---|---|---|---|---|
| 3,511,162 A | * | 5/1970 | Truhan .................. | 128/205.26 |
| 3,820,536 A | * | 6/1974 | Anspach, Jr. et al. ... | 128/202.13 |
| 3,923,482 A | * | 12/1975 | Knab et al. .................... | 55/412 |
| 4,038,974 A | * | 8/1977 | Pielkenrood ................ | 128/847 |
| 4,140,105 A | * | 2/1979 | Duvlis ........................ | 128/847 |
| 4,650,171 A | | 3/1987 | Howorth | |
| 4,876,773 A | * | 10/1989 | Wade ............................ | 5/600 |
| 4,901,410 A | * | 2/1990 | Fischer et al. ................ | 27/21.1 |
| 5,127,411 A | * | 7/1992 | Schoolman et al. ........ | 128/917 |
| 5,160,340 A | | 11/1992 | Gary et al. | |
| 5,226,939 A | * | 7/1993 | Nicolas et al. ................ | 55/309 |
| 5,244,433 A | * | 9/1993 | Utterback .................... | 454/49 |
| 5,620,407 A | | 4/1997 | Chang | |

FOREIGN PATENT DOCUMENTS

JP           200023987           1/2000

OTHER PUBLICATIONS

Coleman, Raymond, "Reducing the Levels of Formaldehyde Exposure in Gross Anatomy Laboratories", The Anatomical Record, vol. 243, num. 4, pp. 531–533, Dec. 1995.
William Martin, et al., "Three Years of Experience with a Dissection Table Ventilation System", Clinical Anatomy, 8:297, pp. 297–302, 1995.
Analysis Report to Applicants (not prior art).

* cited by examiner

Primary Examiner—Jose V. Chen
(74) Attorney, Agent, or Firm—Stevens, Davis, Miller & Mosher, LLP

(57) ABSTRACT

An exhausting device includes an anatomic table having a bearing table surface and a laminar air flow generator having an inlet and an outlet and disposed above the table to cover an inner part of the bearing table surface. The table has a circumference including a trough which surrounds the inner part to form a depressed area for laying an anatomizee. An inner portion of the trough forms a flow path which surrounds four lateral walls of the trough. Middle positions of the four lateral walls have openings to provide connected air seams. One side of the trough includes an air outlet. An exhaust outlet is installed at the corner of the anatomic environment.

12 Claims, 5 Drawing Sheets

EXHAUSTING DEVICE FOR ANATOMIC OPERATION

BACKGROUND OF THE PRESENT INVENTION

1. Field of the Present Invention

The present invention relates to an exhausting device for anatomic operation; while an anatomy is under operation, an air-push effect and an air-pulled effect are produced to completely exhaust the formaldehyde gas, the stink, or the hazardous bacteria carried by the anatomizee out of the anatomic environment, further out of the anatomic room after the treatment of activated carbon and wet scrubber so as to refrain from the diffusion of the formaldehyde gas, the stink, or the hazardous bacteria in the anatomic environment and from polluting the air in order to decrease the exposure of the anatomist to an hazardous working environment.

2. Description of Prior Art

Due to its quickly and effectively fixing and long-term preserving organisms and also its low price and easiness to obtain, formaldehyde has been widely used for a long time; particularly in preserving the dissectee for anatomy, it is one of the major antiseptics. However, it has defects including irritating smell and high volatility which strongly stimulate eyes, noses, throat, and respiratory organs. Those who have long-term exposure to and contact with an environment of formaldehyde are subject to a moderate nervous symptom such as headache. Therefore, anatomists and students are afraid of staying in the anatomic room or anatomic laboratory which are deemed as disliked location for working or learning.

However, all anatomists and students admit that anatomic operation and anatomy class on real anatomizee contribute to practical experience and medical information, which can not be compared nor substituted by state-of-the-art multimedia computer-aided teaching program. Therefore, anatomists and students can not help enduring long-term exposure to and contact with an environment of formaldehyde in order to acquire the needed and precious experience and medical knowledge.

On the other hand, in terms of adverse effects caused by the exposure to and the contact with formaldehyde environment, especially the fact of its endangering human body, the hygiene, labor, environment protection authorities have recently paid high attention to it. For the health sake of those such as anatomists and students, the relative authorities have specified in using standard of formaldehyde environment and have limited an exposure degree for formaldehyde environment. Some means or equipments assisting to limit contact with formaldehyde environment have been successively disclosed though, they still can not effectively reach the using standard of formaldehyde environment. Said means includes researching and developing a substitute of formaldehyde, which not only retains the long-term preservative property of formaldehyde but also has a property of unaffecting human health. Unfortunately, this kind of substitute is still under experiment, there is a long way to go to accomplish the development.

In addition, some use the air conditioning techniques to improve formaldehyde environment, which directly installs an air-drawing equipment on the ceiling up above the anatomic environment in order to draw the formaldehyde gas upward to the ceiling direction and out. Since the drawn out path of formaldehyde gas is directed towards the upper position of the heads of anatomists and students, which causes anatomists and students to breathe, on the contrary, excess formaldehyde gas than that of limited standard so as to bring about adverse effect.

The other resolution is, referring to FIG. 1, to install an air-drawing device under the inside of the anatomic table (70) of which the circumference has air-drawing holes (71). By using the suction function caused by the air-drawing motor of the air-drawing device, the formaldehyde gas flows downwards through the air-drawing holes (71) of the circumference of the table surface of the anatomic table (70) to the inside under the table surface, which is further treated by the activated carbon and exhausted through both sides (72). Though the formaldehyde gas surrounding the anatomizee above the anatomic table (70) is drawn and flows downwards instead of floating upwards, the formaldehyde gas above the anatomizee may still float upwards; therefore, the anatomic table (70) only partially improves the defect of said installing an air-drawing device on the ceiling and still endangers the anatomist or the student of breathing excessive formaldehyde gas than allowed standards; in addition, the activated carbon has no function of adsorbing or decomposing the formaldehyde gas. Therefore, this kind of anatomic table (70) which uses activated carbon to treat formaldehyde gas only has effects of air-filtering and deodorizing; the formaldehyde gas which is drawn into under the anatomic table (70) then further exhausted through both sides (72) of the anatomic table (70) again diffuses around the anatomic environment; and the specific gravity of formaldehyde gas is greater than that of the air, which makes the formaldehyde gas deposit downwards and also makes the anatomists or the students breathe excess formaldehyde gas than allowed standards to affect their health; therefore, it remains to be improved.

SUMMARY OF THE PRESENT INVENTION

The exhausting device for anatomic operation of the present invention uses the principle of push and pull caused by air to exhaust the volatile gas (such as the stink or the formaldehyde antiseptic solution, etc.) scattered by the anatomizee out of the anatomic environment by air-pushing and air-pulling in order to decrease the exposure of the anatomist to an hazardous working environment.

The present invention installs one set of laminar air flow generator, such as the conventional high efficiency particulate air (HEPA) type filter, at the upper position of the anatomic table in order to transform the air into a clean laminar air flow which steadily flows downwards vertically out of the outlet so as to push and rush the volatile gas above the anatomizee downwards favorably and smoothly; therefore, the gas containing the formaldehyde gas, the stink, or the hazardous bacteria does not diffuse upward to the anatomist's breathing location, thereby to reach an air-pushing effect.

The circumference of the anatomic table of the present invention forms a bulgy surface table air split trough. An air-pulling effect can be exercised by drawing the volatile gas of the anatomizee through an air seam at the four lateral sides of the surface table air split trough thereinto, which also pulls the downward air flow pushed by the laminar air flow generator (which is installed up above) through an exhaust air treatment facility to underground or outside after being treated.

The exhaust air treatment facility is composed of an activated carbon adsorbing device and a wet scrubber, through which the pulled out hazardous air is deodorized by activated carbon and the formaldehyde thereof is dissolved (using the property of formaldehyde of being apt to dissolve in water) in the water of wet scrubber and its concentration is reduced; then, the treated air is exhausted to the atmosphere.

In addition, an exhaust outlet is installed at the corner of the anatomic environment to exhaust the little amount of deposited formaldehyde gas on the floor surface of the anatomic environment out of the anatomic room, which decreases the leak of infection source or the diffusion of hazardous gas to neighboring working place in order to reduce the opportunity of secondary pollution.

The primary purpose of the present invention is to use the laminar air generator and the anatomic table of which the circumference forms a bulgy surface table air split trough to produce an effect of push and pull in order to exhaust the formaldehyde gas, stink, or hazardous bacteria carried by the anatomizee out of the anatomic environment so as to decrease the exposure of the anatomist to an hazardous working environment.

The secondary purpose of the present invention is to design an exhaust air treatment facility composed of an activated carbon adsorbing device and a wet scrubber, which effectively treats the air containing formaldehyde gas, stink, or hazardous bacteria in order to refrain from the secondary pollution.

The other purpose of the present invention is to design an exhaust outlet which is installed at the corner of the anatomic environment to decrease the leak of infection source or the diffusion of hazardous gas to neighboring working place.

BRIEF DESCRIPTION OF THE DRAWING FIGURES

DETAILED DESCRIPTION OF THE PREFERRED EMBODIMENTS

Figure 1:
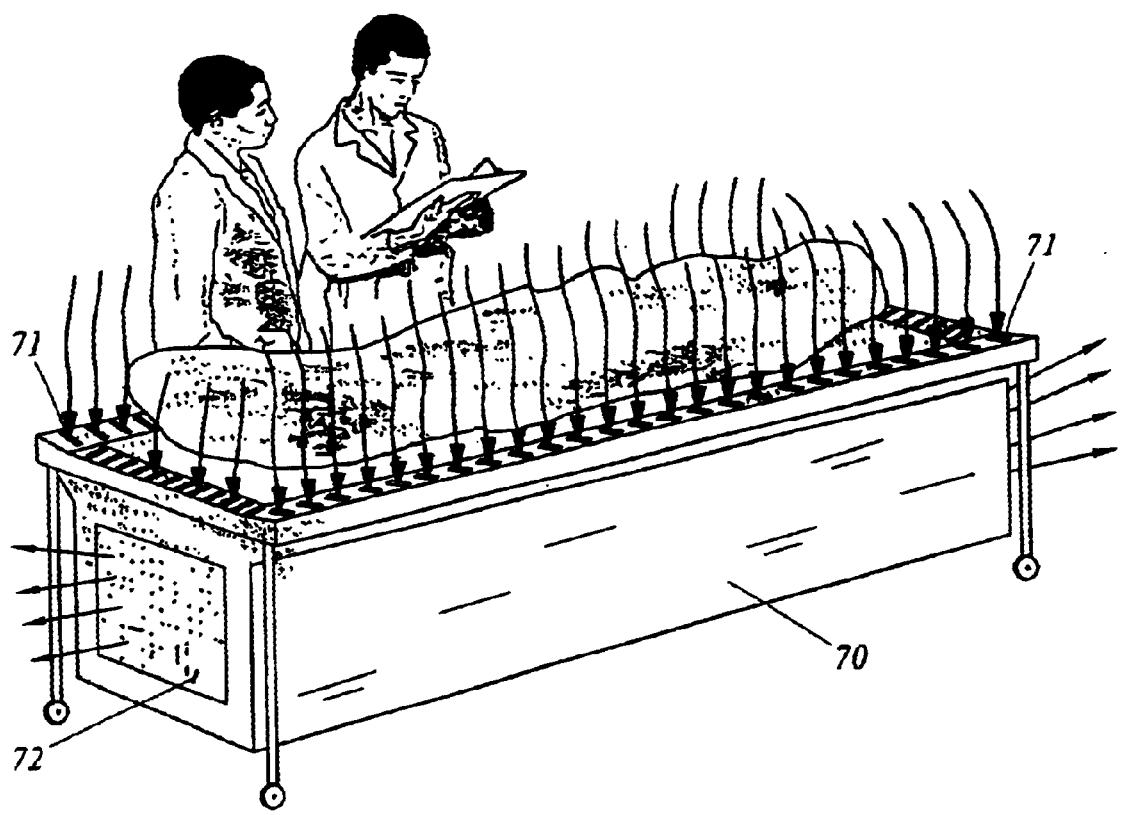
FIG. 1 is a conventional anatomic table with an air-drawing device.
Figure 2:
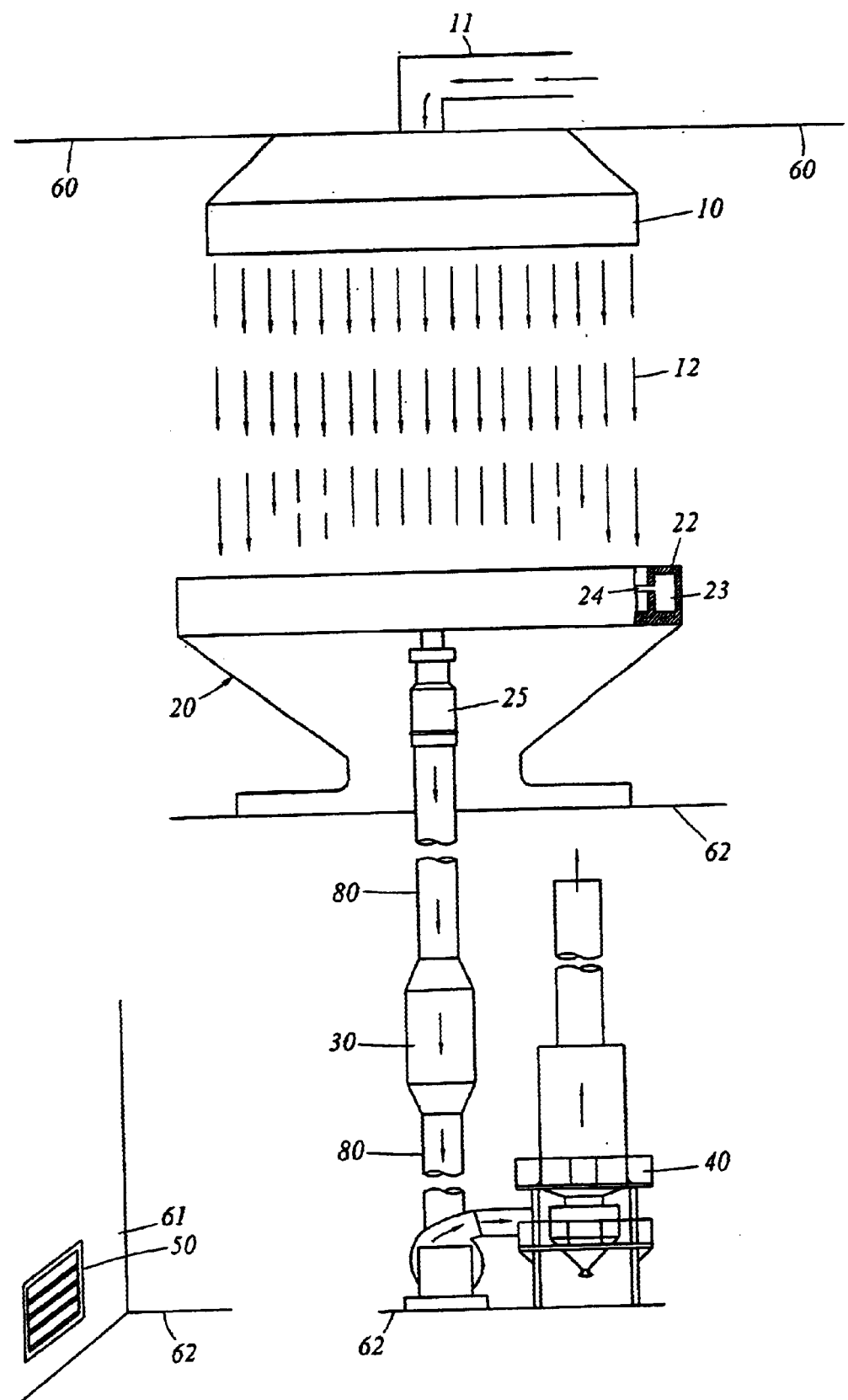
FIG. 2 is a schematic diagram of an exhausting device for anatomic operation of the present invention.

Referring to FIG. 2, the exhausting device for anatomic operation of the present invention comprises a laminar air flow generator (10), an anatomic table (20), an activated carbon adsorbing device (30), and a wet scrubber (40).

The laminar air flow generator (10) is a device which is capable of filtering the air led therein by an air duct (11) to become clean air which also forms a vertically downward and steadily effluent laminar air flow. A traditional high efficiency particulate air (HEPA) type air filter which outputs a laminar air flow with a velocity of 0.3~0.4 m/sec is a preferred embodiment of the present invention.

The laminar air flow generator (10), which is located at right up above the anatomic table (20) and at a distance of about 120 centimeters from the anatomic table (20), is fixed to the ceiling (60) of the anatomic operation environment. The area of the vertically downward laminar air flow which steadily flows out of the outlet of the laminar air flow generator (10) is designed to be about the same with that of the bearing table surface (21) of the anatomic table (20), which makes the area of the vertically downward laminar air flow completely cover the anatomizee laid on the bearing table surface (21) of the anatomic table (20); therefore, the volatile gas above the anatomizee such as the formaldehyde gas, the stink, or the hazardous bacteria can be pushed downwards favorably and smoothly so as not to flow or diffuse upwards to the anatomist's breathing location, thereby to reach an air-pushing effect.

Figure 3:
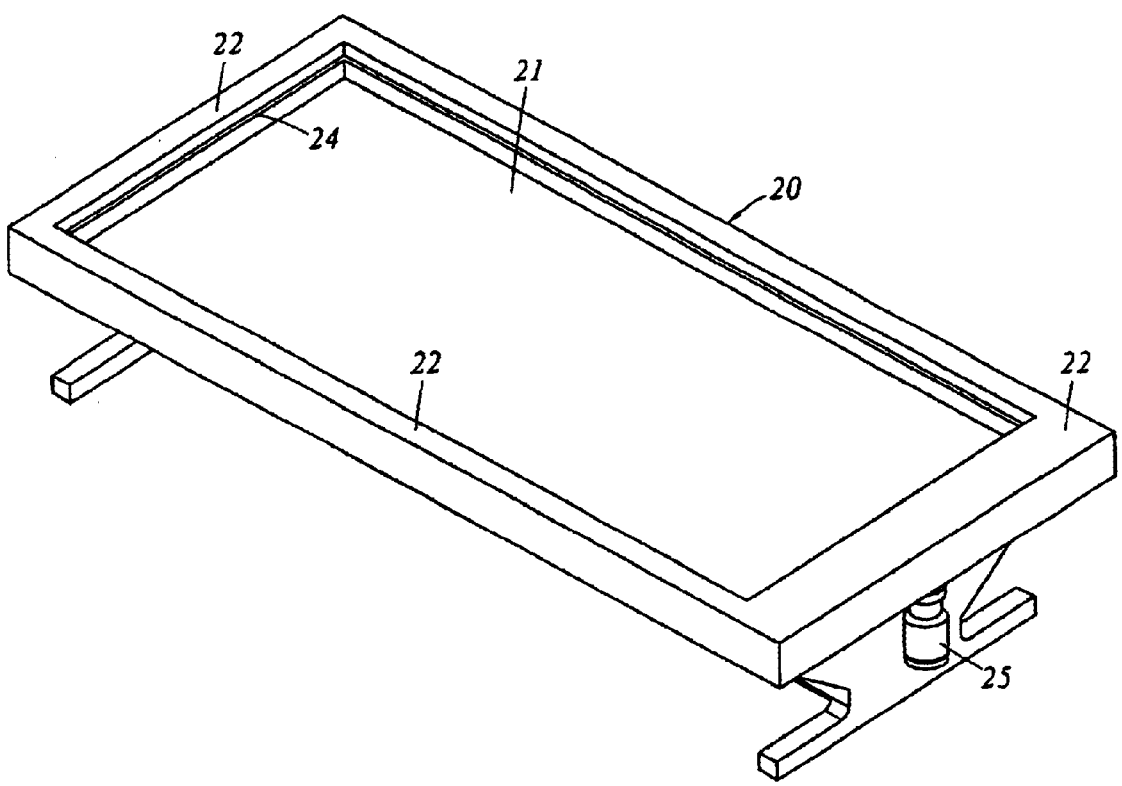
FIG. 3 is a perspective drawing of the anatomic table of the present invention.
Figure 4:
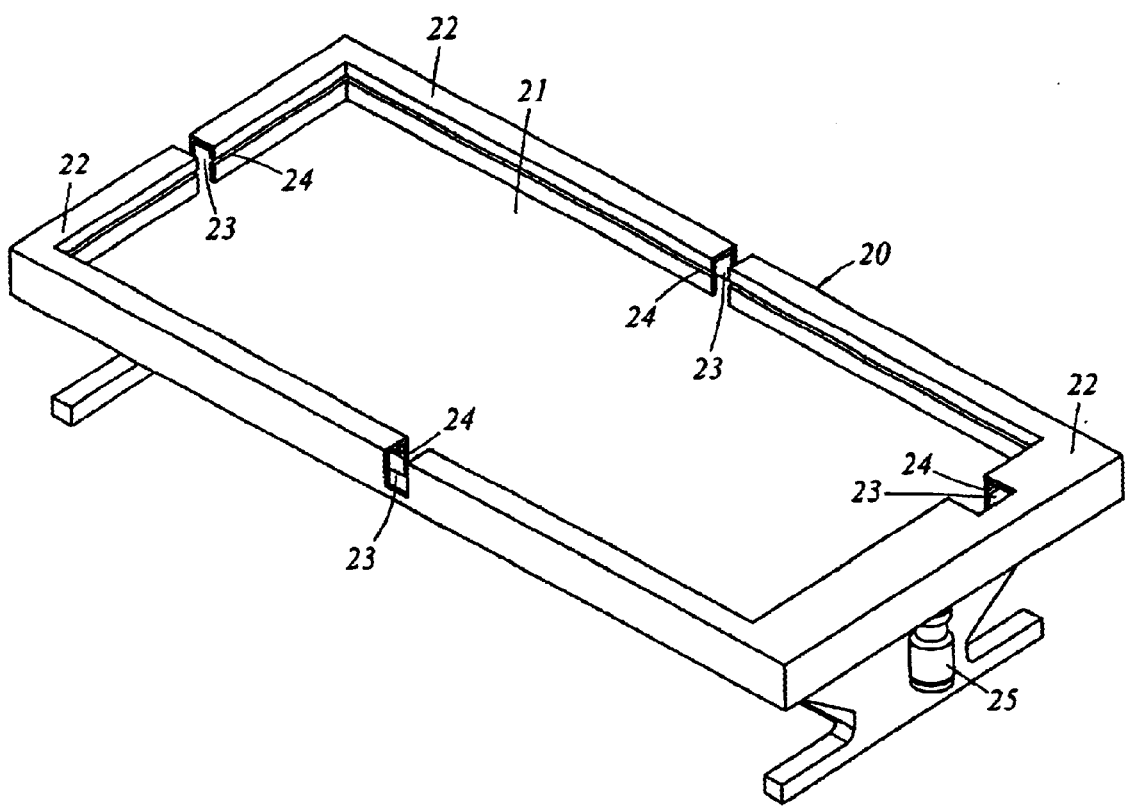
FIG. 4 is a local perspective drawing for the surface table air split trough of the anatomic table of the present invention.

Referring to FIG. 3, the structure of the anatomic table (20) of the present invention is that the circumference of the anatomic table (20) forms a bulgy surface table air split trough (22); the depressed area which is surrounded by the surface table air split trough (22) forms a bearing table surface (21) (which is used for laying the anatomizee) of the anatomic table (20). Further referring to FIG. 4, the inner of the surface table air split trough (22) forms a run-through hollow flow path (23) which surrounds the four lateral walls intervened between the surface table air split trough (22) and the bearing table surface (21); the middle positions of the four lateral walls are opened with connected air seams (24) which split the lateral walls of the surface table air split trough (22) and run through the hollow flow path (23); therefore, the surface table air split trough (22) runs through the upper area above the bearing table surface (21).

An air outlet, which is installed at the lower location of one of the shorter sides of the surface table air split trough (22) of the anatomic table (20), is connected to an air-drawing motor (25). The air-drawing motor (25) with a suction flow rate of 20 m$^3$/min, an air velocity of 4~6 m/sec, and an obtained suction air velocity of 4.3 m/sec at the air seam (24) is a preferred embodiment.

Therefore, while the air-drawing motor (25) is under operation, the hollow flow path (23) in the inner of the surface table air split trough (22) forms a negative pressure state; the hollow flow path (23) with a suction pressure of 2 mmH$_2$O greater than the laminar air flow pressure is the preferred embodiment of the present invention; thereby, the air at the area up above the bearing table surface (21) of the anatomic table (20) is steadily drawn into the hollow flow path (23) through the air seam (24) at the circumference of the surface table air split trough (22), and then drawn by the air-drawing motor (25) out of the anatomic table (20) through the air outlet so as to reach an air-pulling effect.

Moreover, the air-drawing motor (25) of the present invention uses a duct (80) to connect with an activated carbon adsorbing device (30) and a wet scrubber (40). The hazardous air led out by the pulling of the air-drawing motor (25) is deodorized by the activated carbon adsorbing device (30) and the formaldehyde thereof is dissolved (using the property of formaldehyde of being apt to dissolve in water) in the water of the wet scrubber (40) and its concentration is reduced; then, the treated air is exhausted to the atmosphere.

In addition, an exhaust outlet (50) is installed at the wall corner (61) of the anatomic environment to exhaust the little amount of deposited formaldehyde gas on the floor surface (62) of the anatomic environment out of the anatomic room, which decreases the leak of infection source or the diffusion of hazardous gas to neighboring working place in order to reduce the opportunity of secondary pollution.

Figure 5:
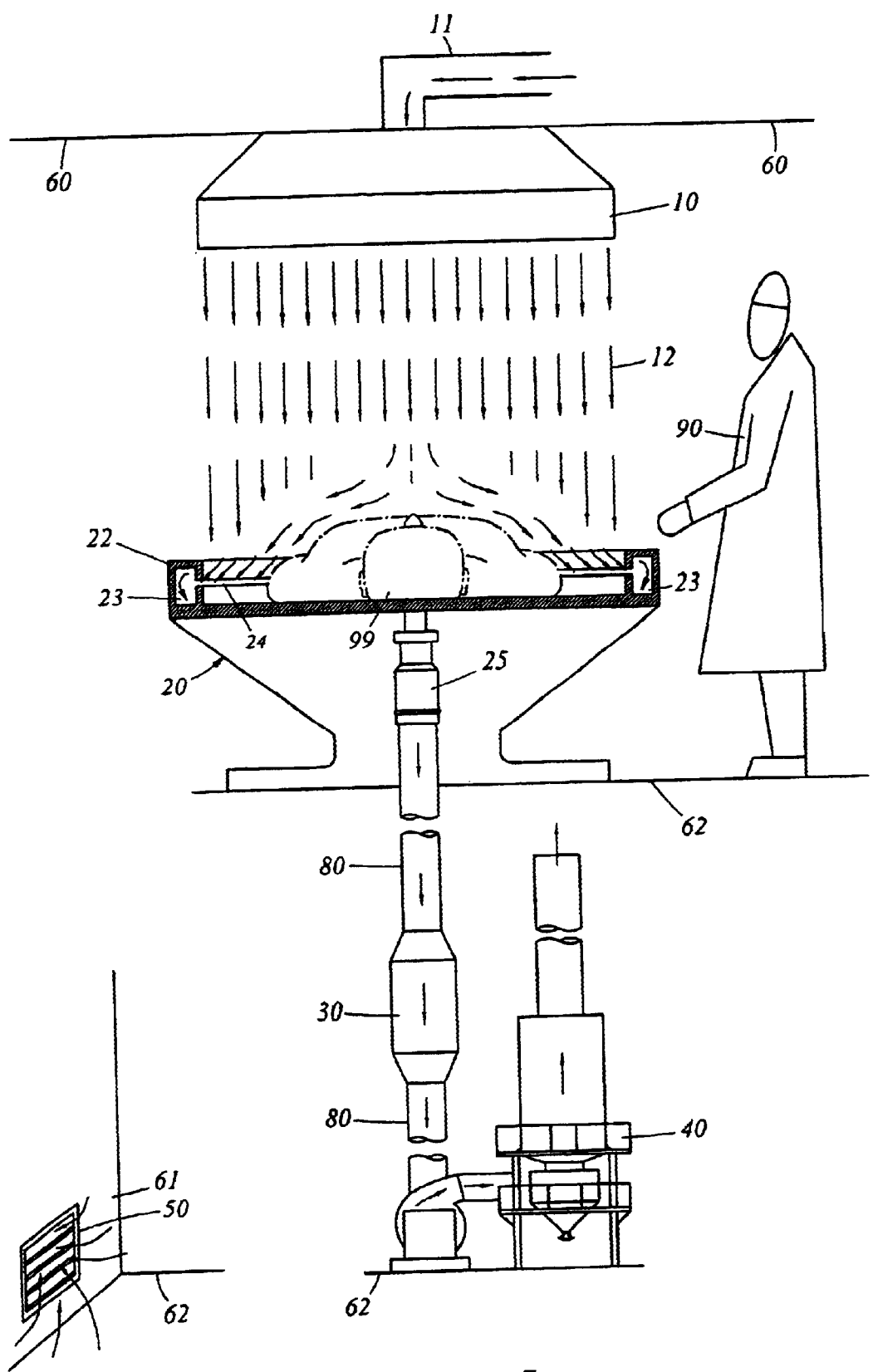
FIG. 5 is an operation schematic drawing of the exhausting device for anatomic operation of the present invention.

Referring to FIG. 5, while the anatomic operation is being undertaken by the anatomist or the student (90), the volatile gas (including the formaldehyde gas, the stink, or the hazardous bacteria) scattered by the anatomizee (99) which is laid on the bearing table surface (21) of the anatomic table

(20) of the present invention will be pushed by the vertically downward steady laminar flow generated by the laminar air flow generator (10) so as to smoothly flow downwards. Since the area of the downward laminar air flow completely covers the bearing table surface (21) of the anatomic table (20), the volatile gas scattered by the anatomizee (99) will not flow upwards to the breathing location of the working personnel.

Meanwhile, the air-drawing motor (25) has been operating to suck the air at the area surrounding the bearing table surface (21) of the anatomic table (20) into the hollow flow path (23) steadily through the air seam (24) surrounding the surface table air split trough (22), and to suck away the scattered volatile gas surrounding the anatomizee (99) and the downward air pushed by the vertically downward flow generated by the laminar air flow generator (10). Therefore, the volatile gas scattered by the anatomizee (99) will not float outwards in the anatomic environment. Meanwhile, In addition, if a little amount of formaldehyde gas is deposited on the floor surface of the anatomic environment, an exhaust outlet (50) which is installed at the wall corner (61) of the anatomic environment to exhaust out of the anatomic room, which decreases the leak of formaldehyde gas or the diffusion of hazardous gas to neighboring working place.

The air, which is sucked and expelled by the air-drawing motor (25), passes through the duct (80) and the activated carbon adsorbing device (30) and the wet scrubber (40) and is exhausted to the atmosphere after being deodorized and reduced the formaldehyde concentration so as to mitigate the secondary pollution.

The present invention can therefore be provided as the anatomic table for medical institutions, or as the pathology anatomic table for hospitals, or as the device for the pathology anatomic room and the remains' make-up room of the undertaker's.

What is claimed is:

1. An exhausting device for anatomic operation, comprising:
   a laminar air flow generator having an inlet and an outlet; and
   an anatomic table having a bearing table surface;
   said laminar air flow generator being disposed above said anatomic table and filtering air to provide a clean laminar air flow out of said outlet to cover an inner part of an area of said bearing table surface;
   said anatomic table having a circumference that extends outwardly of said inner part and includes an air split trough which surrounds said inner part to form a depressed area of the bearing table surface for laying an anatomizee;
   an inner portion of said trough forms a run-through hollow flow path which surrounds four lateral walls of said trough intervened between said trough and said bearing table surface;
   middle positions of said four lateral walls having openings to provide, connected air seams which split said four lateral walls and run through said hollow flow path, wherein said trough runs through an upper area above said bearing table surface by way of said air seams; and
   one side of said trough includes, an air outlet.

2. The exhausting device for anatomic operation defined as claim 1 wherein said laminar air flow generator is a HEPA type air filter.

3. The exhausting device for anatomic operation defined as claim 2, wherein said laminar air flow generator is located at a distance of 120 centimeter from the bearing table surface of the anatomic table and generates a laminar air flow velocity of 0.3~0.4 m/s.

4. The exhausting device for anatomic operation defined as claim 3, wherein the air outlet is connected to an air-drawing motor to make the air seam of said trough have a suction air velocity of 4.3 m/sec and a suction air pressure of 2 mmH$_2$O higher than a laminar air flow pressure.

5. The exhausting device for anatomic operation defined as claim 2, wherein the air outlet is connected to an air-drawing motor.

6. The exhausting device for anatomic operation defined as claim 5, wherein the air-drawing motor makes the air seam of the anatomic table have a constant suction air velocity of 4.3 m/sec.

7. The exhausting device for anatomic operation defined as claim 5, wherein an exhaust outlet is provided at a wall corner of an anatomic environment.

8. The exhausting device for anatomic operation defined as claim 7, wherein the air-drawing motor makes a suction air velocity at said air seams of the anatomic table have a constant velocity of 4.3 m/sec.

9. The exhausting device for anatomic operation defined as claim 7, wherein the air-drawing motor is connected to an activated carbon adsorbing device through an air duct.

10. The exhausting device for anatomic operation defined as claim 9, wherein the activated carbon adsorbing device is further connected to a wet scrubber.

11. The exhausting device for anatomic operation defined as claim 5, wherein the air-drawing motor is connected to an activated carbon adsorbing device through an air duct.

12. The exhausting device for anatomic operation defined as claim 11, wherein the activated carbon adsorbing device is further connected to a wet scrubber.

* * * * *